United States Patent [19]
Wolfe et al.

[11] Patent Number: 5,438,168
[45] Date of Patent: Aug. 1, 1995

[54] TOUCH PANEL

[75] Inventors: Andrew Wolfe; Gary L. Barrett, both of Austin, Tex.

[73] Assignees: Gunze Limited, Kyoto, Japan; The Graphics Technology Company, Austin, Tex.

[21] Appl. No.: 34,836

[22] Filed: Mar. 17, 1993

[30] Foreign Application Priority Data

Mar. 18, 1992 [JP] Japan .................. 4-061908

[51] Int. Cl.⁶ .............................................. G08C 21/00
[52] U.S. Cl. ............................... 178/20; 345/174
[58] Field of Search .................. 178/18, 19, 20; 345/156, 173, 174

[56] References Cited

U.S. PATENT DOCUMENTS

| | | | |
|---|---|---|---|
| 3,449,516 | 6/1969 | Cameron et al. | 178/18 |
| 3,699,439 | 10/1972 | Turner | 178/18 X |
| 4,177,354 | 12/1979 | Mathews | 178/18 |
| 4,198,539 | 4/1980 | Pepper, Jr. | 178/18 |
| 4,442,317 | 4/1984 | Jandrell | 178/18 |
| 4,570,149 | 2/1986 | Thornburg et al. | 178/20 X |
| 4,694,342 | 9/1987 | Ito | 358/236 |
| 4,752,655 | 6/1988 | Tajiri et al. | 178/20 X |
| 5,266,750 | 11/1993 | Yatsuzuka | 178/18 X |

*Primary Examiner*—Stephen Chin
*Assistant Examiner*—Paul Loomis
*Attorney, Agent, or Firm*—Armstrong, Westerman, Hattori, McLeland & Naughton

[57] ABSTRACT

A touch panel of the present invention consists of a rectangular resistance member on which a potential gradient formation area is formed, a plurality of thin film active elements constructed in accordance with a side of the potential gradient formation area. Each of the thin film active elements has a couple of potential gradient formation current terminals. One of them is connected to the side of the potential gradient formation area while the other one is connected to the gradient formation current terminal included in another thin film active element at the same side as well as connected to a terminal for an external unit.

1 Claim, 8 Drawing Sheets

*PRIOR ART*

101 — CONDUCTIVE PATTERN

FIG. 10

STRIP-LIKE INSULATING MEMBER

FIG. 11

TOUCH PANEL

BACKGROUND OF THE INVENTION
(1) Field of the Invention

This invention relates to a touch panel device employed by a computer system as an input system to locate a position pushed by a finger or a pen-like material.
(2) Description of the Related Art According to a well known touch panel, a fixed potential gradient is formed on a resistance material and a position to which a stylus pen or the like supplies external force is located with reference to the potential detected at the pushed position.

Figure 1:
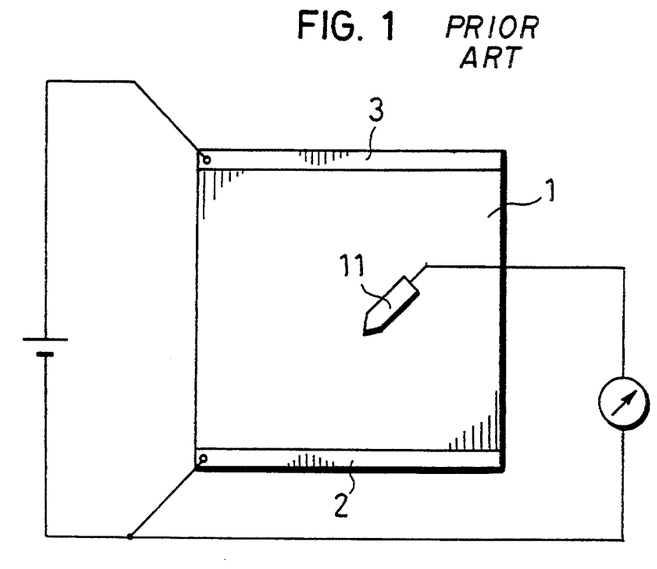
FIG. 1 is an illustration showing a construction of a first conventional touch panel.

For example, the conventional touch panel in FIG. 1 comprises a quadrilateral planar resistance member 1 and electrodes 2 and 3 connected at ends of the resistance member 1, the ends opposing to each other. In this construction, potential difference between the electrode 2 and the stylus pen 11 is proportional to a physical distance therebetween. Based on a ratio of the potential difference to the distance, the position of the stylus pen 11 is detected when it contacts with the resistance member 1.

Figure 2:
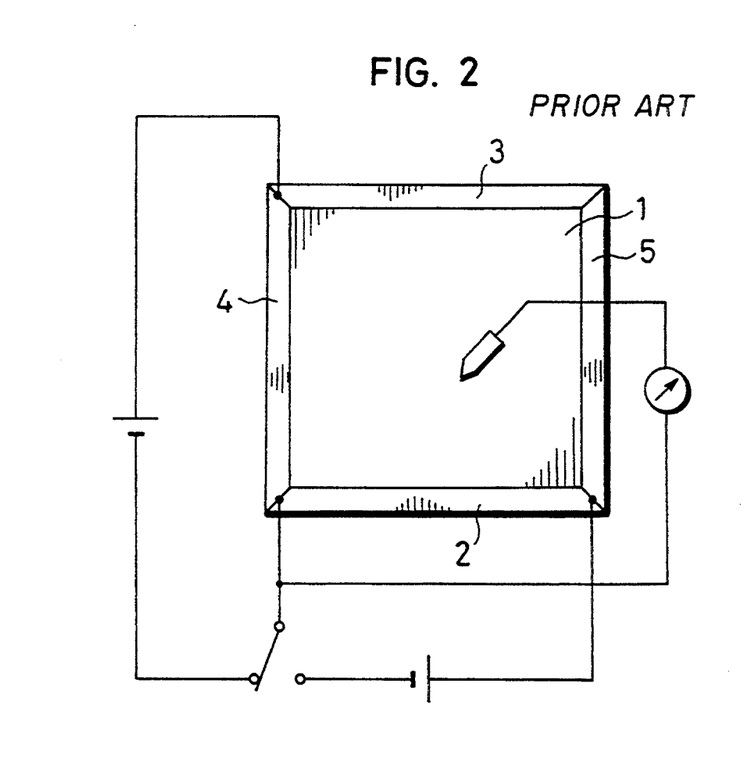
FIG. 2 is an illustration showing a construction of a second conventional touch panel.

Another touch panel in FIG. 2 detects the pushed position in two dimensions. As shown in the figure, the touch panel includes electrodes 4 and 5 besides the components of the above touch panel. In this construction, potential is supplied to a first pair of electrodes and a second pair of electrodes mutually, the first pair including electrodes 2 and 3 while the latter pair including electrodes 4 and 5. Thus, X and Y coordinates of the pushed position are detected one after the other.

Figure 3:
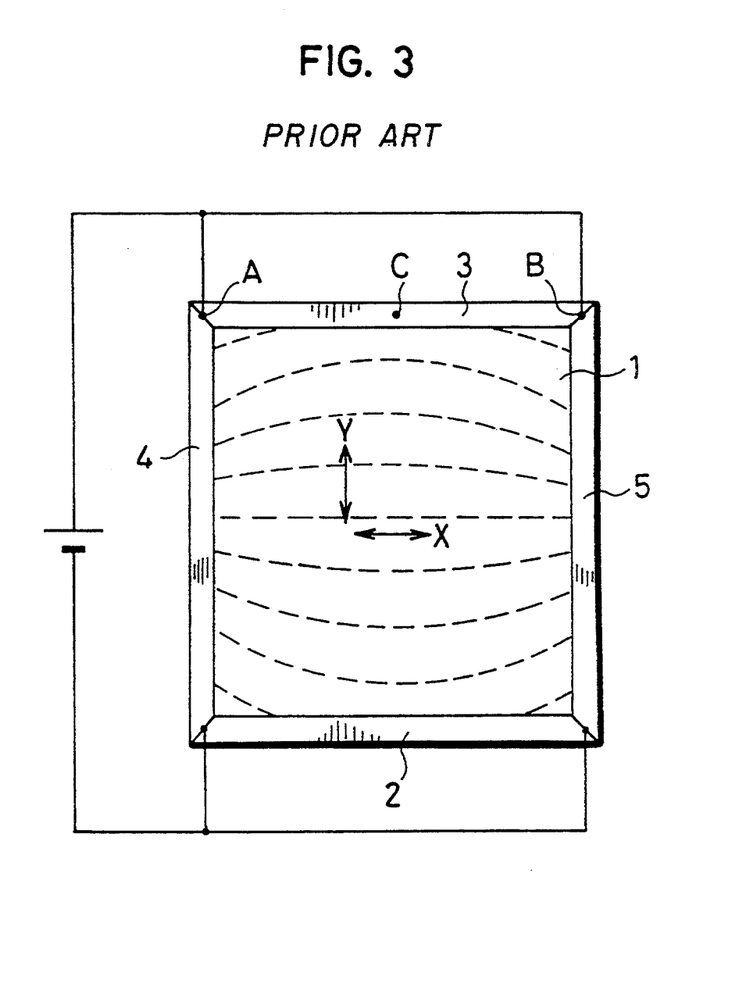
FIG. 3 is an illustration showing a construction of a third conventional touch panel.

According to the touch panel where the planar resistance member 1 has the electrodes 2 through 5 at all ends thereof, some current leaks. For example, when the potential is supplied between the electrodes 2 and 3, some of the potential leaks via the electrodes 4 and 5. Such leak increases power dissipation noticeably. The power dissipation can be suppressed if the electrodes 2 through 5 have some resistances. In this case, the wiring of the touch panel will be constructed as shown in FIG. 3. Another wiring can be added in the figure to detect X coordinate of the pushed position.

However, when each of the electrodes 2 through 5 has some resistance, the potential cannot be applied to the whole electrode equally. For example, when the electrode 3 has some resistance, the potential at point A or B thereof may differ from the potential at point C. As a result, as shown in the figure the equipotential lines will not be straight and the proportional relation between the potential difference and the physical distance will be broken, so that the accuracy in the detection of the pushed position will be deteriorated. The proportional relation between the potential difference and the physical distance would be retained by an equation and a correction; however, this will hurt simple structure of the device.

Figure 4:
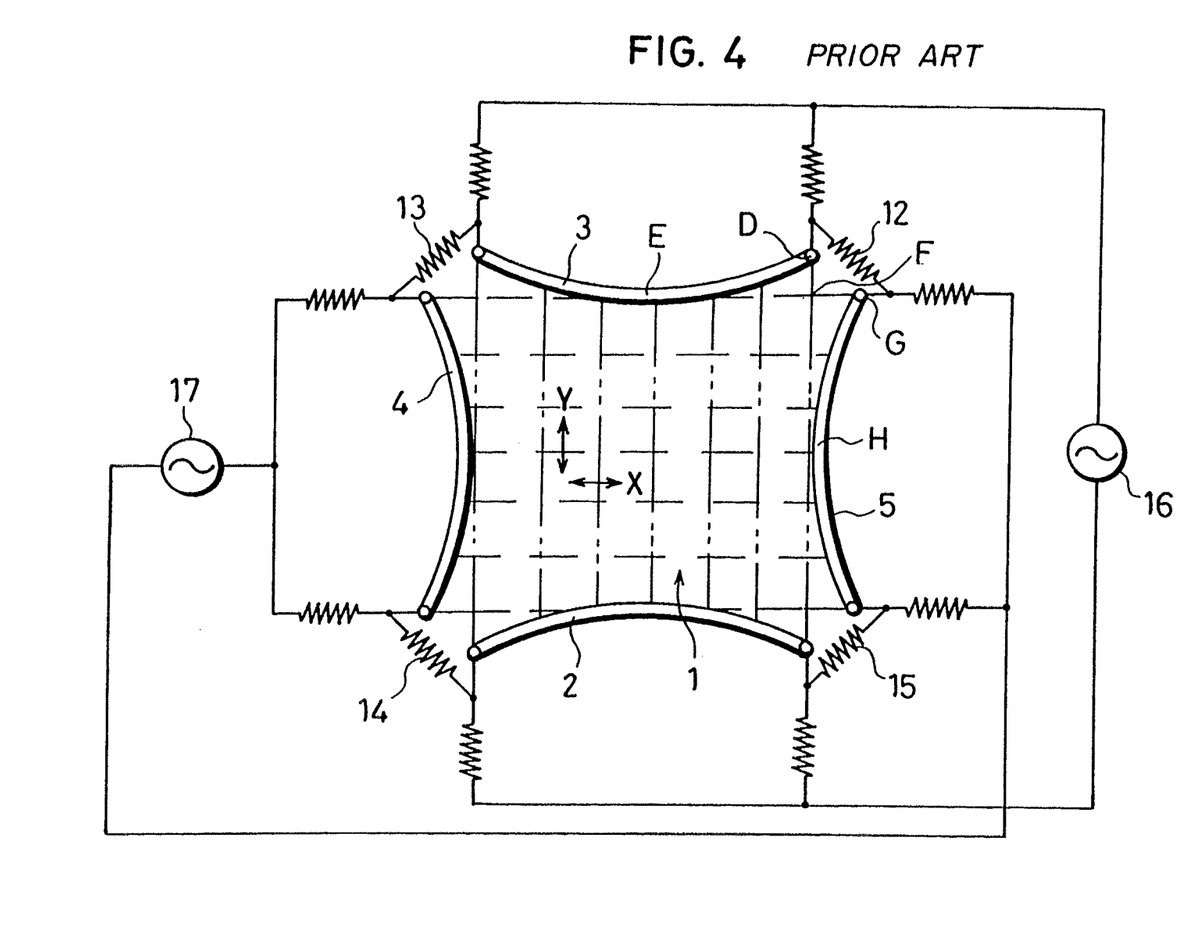
FIG. 4 is an illustration showing a construction of a fourth conventional touch panel.

A touch panel disclosed in U.S. Pat. No. 4,198,539 is designed to overcome the above problems. As shown in FIG. 4, the electrodes 2 through 5 are curved and they are connected via resistances 12 through 15.

The electrodes 2 through 5 and the resistances 12 through 15 have fixed resistances. In this construction, both equipotential lines extending along X and Y axes, the former shown by broken lines while the latter shown by two-dot chain lines in the figure, become straight since the potential drop between the points D and E is equal to the potential drop between the points D and F when the power source 16 is turned on. Also the same potential drop is applied between ends of the resistance 12. Similarly, when the power source 17 is turned on, the potential drop between the points G and H is equal to the potential drop between the points G and F. Also the same potential drop is applied to between ends of the resistance 12.

However, the conventional touch panel in FIG. 4 still has some drawbacks to be overcome. That is, the resistance member enlarges when it is surrounded by the curved electrodes. As apparent from the figure, the resistance member 1 surrounded by the curved electrodes 2 through 5 includes areas in which the pushed position is not detected besides an active sensing area. Hence, the touch panel tends to be oversized when it employs the curved electrodes.

The power dissipation of the touch panel will become high due to the leak of the potential via the electrodes 12 through 15, same as the above conventional touch panel, as well as due to the potential drops such as the one applied between ends of the resistance 12.

Another well known conventional touch panel prevents the leak of current and the non-straight equipotential lines by replacing each of the electrodes 2 through 5 with a plurality of short electrodes being apart from each other, each of the short electrodes having its own switch and diode. The switches and the diodes can be connected to the resistance member externally, or can be formed thereon. However, there still has problems in either case. That is, when they are connected to the resistance member externally, a connector for connecting the switches and diodes to the touch panel includes a large number of terminals, so that the connector will be oversized. Also the contact resistance of the connector deteriorate accuracy of the detection. When the switches are formed on the resistance member 1, the equipotential lines will not be straight enough since the number of the switches the resistance member 1 can accommodate thereon is limited.

SUMMARY OF THE INVENTION

Accordingly, this invention has an object to provide a touch panel for improving accuracy of the pushed position detection, reducing the size thereof, and/or reducing the power dissipation.

The above object may be fulfilled by a touch panel comprising a rectangular resistance member including a potential gradient formation area, a plurality of thin film active elements constructed in accordance with a side of the potential gradient formation area, wherein each of the thin film active elements has a couple of potential gradient formation current terminals, comprised of one being connected to the side of the potential gradient formation area and the other one being connected to the gradient formation current terminal included in another thin film active element at the same side while being connected to a terminal for an external unit.

The thin film active elements may be comprised of a rectifying device such as a diode or a switching element such as a field effect transistor or a junction transistor. The potential gradient formation current terminal at each of the thin film active elements may be connected to the resistance member directly or connected thereto via a conductive pattern. The resistance member may be formed on the larger base member, and each of the thin film active elements may be placed at periphery surrounding the resistance member. A strip-like insulating film may be placed at the periphery of the resistance member and each of the thin film active elements may be placed thereon.

In this construction, the size of the touch panel will be reduced since the thin film active elements which are designed in accordance with each side of the active sensing area on the resistance member can be placed at a narrow space thereof. The number of wiring employed to connect the touch panel to the external units can be reduced; therefore, the size of the touch panel will be reduced. Further, a large number of the thin-film active elements can be placed at a narrow space densely, so that the uniform potential Gradient is formed. Therefore, the detection accuracy will be improved. Finally, decrease of power dissipation can be implemented by preventing the current from flowing via the electrodes placed at the sides of the resistance film.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Embodiment 1

A first embodiment of the present invention will be described hereunder with referring to FIGS. 5 and 6.

Figure 5:
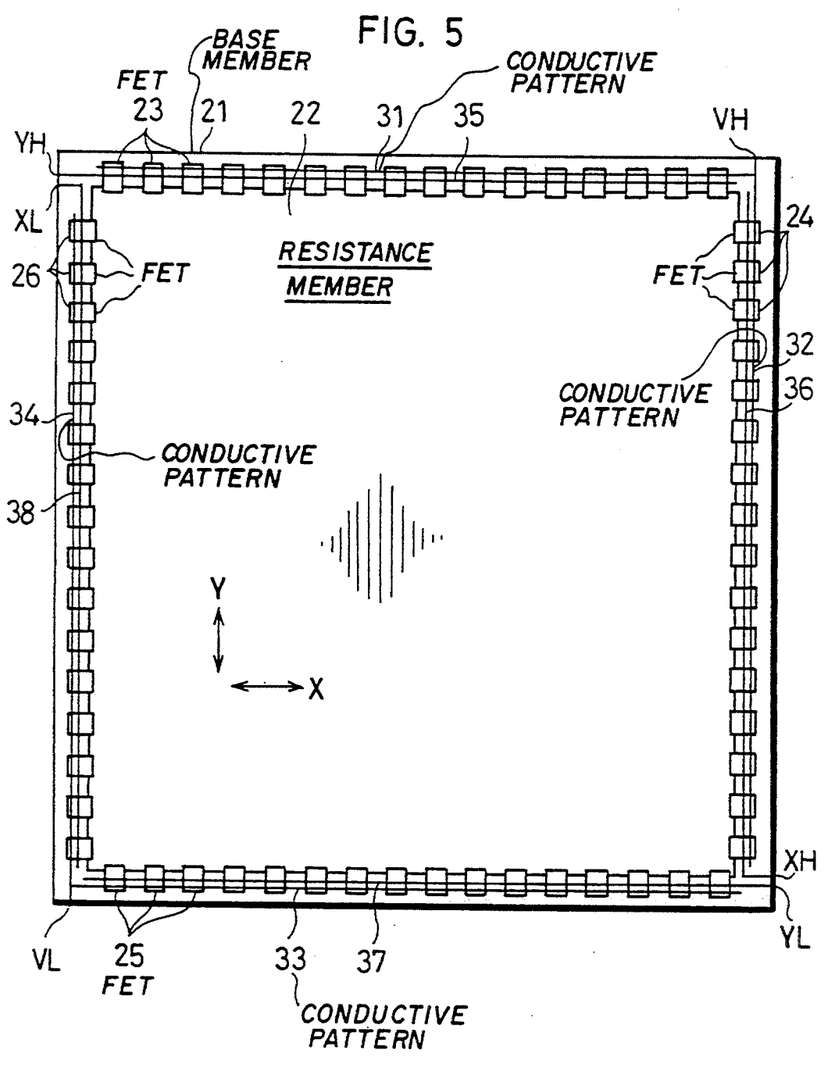
FIG. 5 is an illustration showing a construction of a touch panel in a first embodiment of the present invention.
Figure 6:
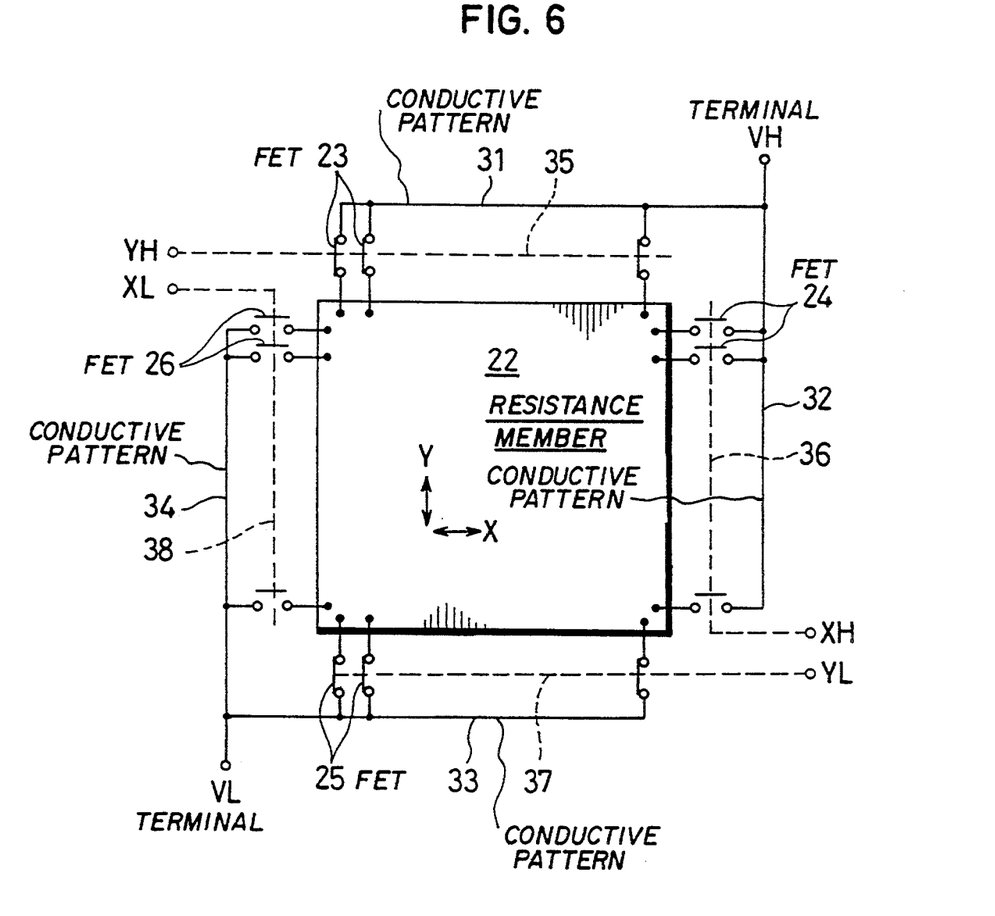
FIG. 6 is a circuit diagram showing the touch panel in the first embodiment of the present invention.

FIG. 5 shows a construction of a touch panel while FIG. 6 shows a circuit diagram of the touch panel. In the latter figure a switch operates as a transistor.

A base member 21 is formed of glass or the like, and a resistance member 22 which has a uniform resistance value of $\rho$ (hereinafter referred to as a planar resistance) per a unit length and a unit width covering the whole member is formed thereon. Although in the figure the square member 22 is employed, rectangle one can also be employed.

The resistance member 22 is comprised either of a thick film resistance or a thin film resistance. Both the thick and the thin film resistances are formed of a semiconductor metal oxide such as an indium-tin oxide (ITO) or a tin-antimony oxide; however, the thick film resistance is formed by coating the above ingredients while the thin film resistance is formed by spattering or a vapor depositing them. Selecting the above materials, the resistance member 22 is constructed to have the planar resistance of 200–1000s $\Omega$ or the like constantly. Also when the member 22 is adhered to the front surface of CRT, it should be transparent. Otherwise, non-transparent member 22 can be employed such as the one employed by a digitizer.

As shown in FIG. 5, the resistance member 22 is surrounded with thin-film MOS type field effect transistors (FETs) 23 through 26 which are based on amorphous silicon. Various types of FETs such as nMOS, pMOS, or cMOS type can be employed as long as they can be switched to invert their states. Further, pnp and npn types of junction transistors may replace the FETs. Also the spaces between a couple of the FETs placed at the same side may not be precisely equal to each other. That is, as long as they are placed densely, equipotential lines, which will be described later, will not be affected by irregularity of the intervals. Also according to the touch panel of the present invention, not all of the transistors need to operate well while every transistor operates well when they are mounted on a crystalline liquid display (LCD). Further, the response characteristic of 1 msec may be sufficient in the touch panel of the present invention.

Drains of the FETs 23 and FETs 24 are connected to the resistance member 22 while sources of the FETs 25 and FETs 26 are connected thereto. Also sources of the FETs 23 are connected to each other via a conductive pattern 31, and those of the FETs 24 are connected to each other via a conductive pattern 32. The drains of the FETs 25 are connected to each other via a conductive pattern 33, and those of the FETs 26 are connected to each other via a conductive pattern 34. The sources and drains are connected to an unillustrated power source through potential terminals VH and VL respectively.

A fixed potential is constantly applied between the terminals VH and VL. In this construction, current flows in a direction of Y axis when a control signal is provided to the terminals YH and YL to turn on FETs 23 and FETs 25. In this case, leak of the current between the conductive patterns 32 and 34 will be prevented unless the FETs 24 and the FETs 26 are turned on. Therefore, closely linear equipotential lines which extend along an X axis in parallel to each other are formed on the resistance member 22.

Similarly, equipotential lines along the Y axis are formed thereon when a control signal is provided to control terminals XH and XL so that the FETs 24 and FETs 26 are turned As is described above, current flows on the member 22 in directions of the X and the Y axes alternately. Therefore, when the member 22 is pushed by a stylus pen, the pushed position is detected being based on the potentials of the pushed position in two directions, one detected in the direction of X axis and the other detected in the direction of Y axis.

Hence, compared to the conventional touch panel which supplies resistances to the electrodes or straightens the equipotential lines in accordance with the resistance member such as the shape thereof, the touch panel of the present invention described above conducts more accurate detection without reducing the size of its active sensing area. Also the power dissipation stays minimum since no extra current nor potential is required.

Embodiment 2

A second embodiment of the present invention will be described hereunder with referring to FIGS. 7 and 8, in which like components are labeled with like reference numerals with respect to the first embodiment, and the description of these components is not repeated.

Figure 7:
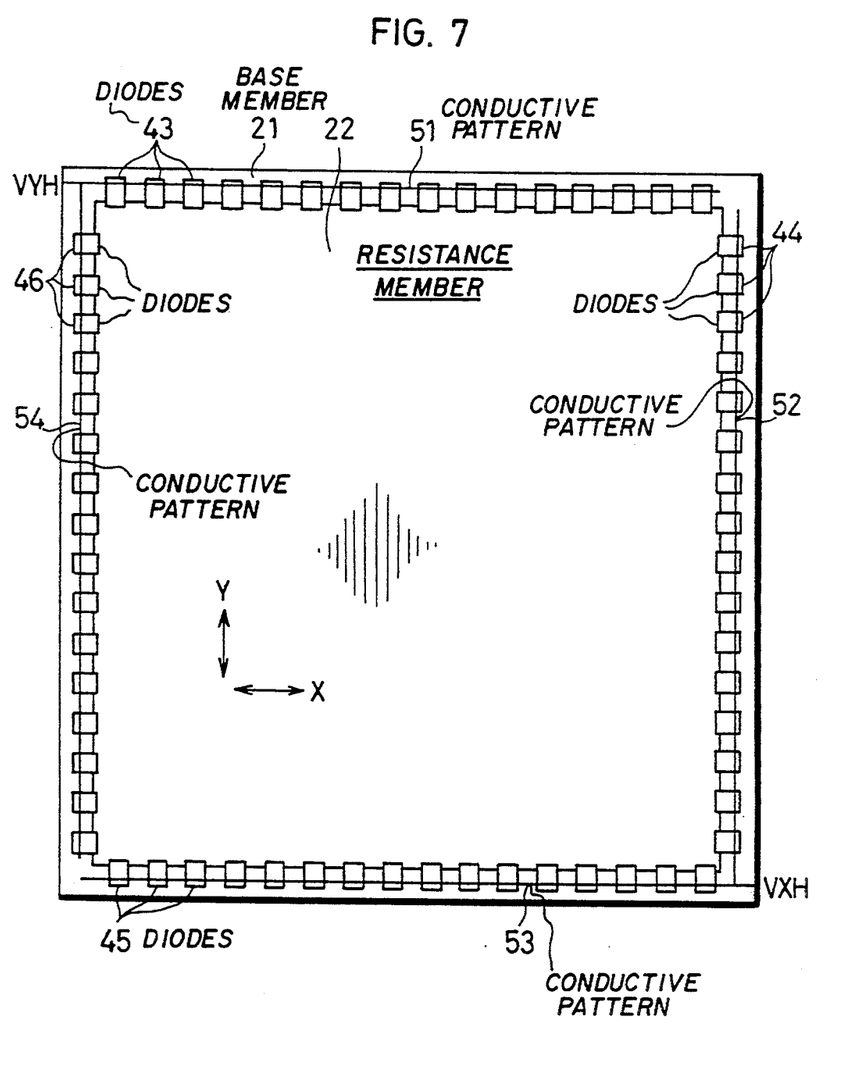
FIG. 7 is a plan view of a touch panel in a second embodiment of the present invention.
Figure 8:
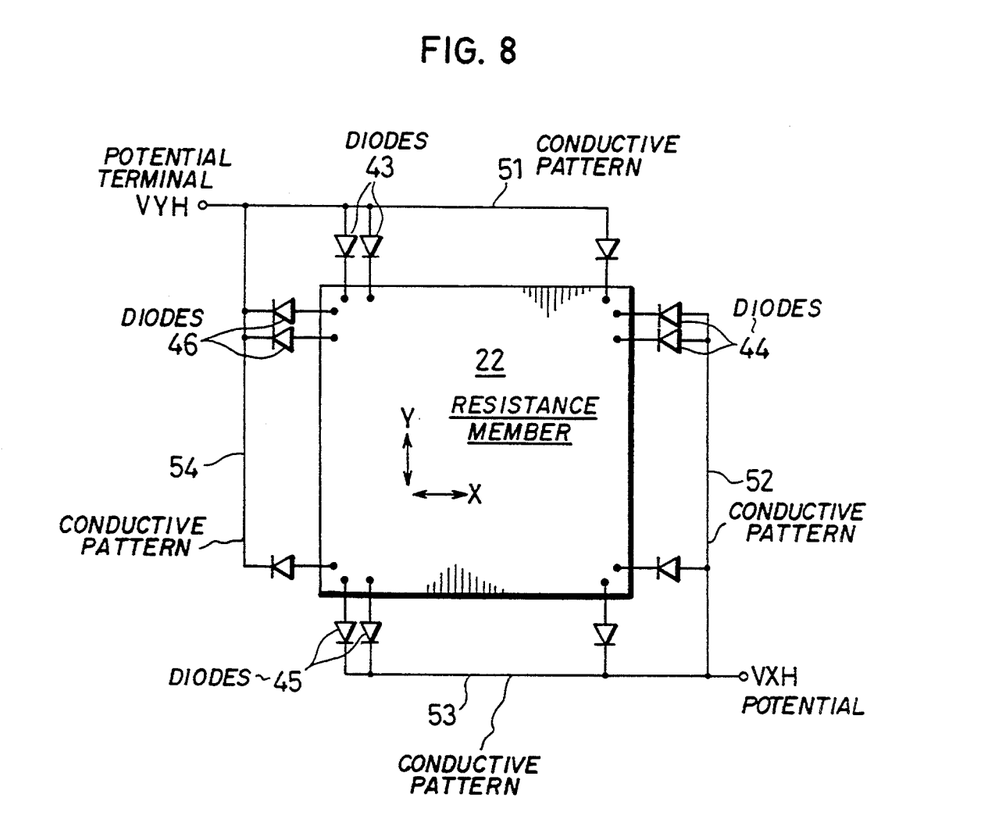
FIG. 8 is a circuit diagram showing the touch panel in the second embodiment of the present invention.

FIG. 7 shows a construction of a touch panel while FIG. 8 shows a circuit diagram of the touch panel.

The touch panel employs diodes 43, diodes 44, diodes, 45, and diodes 46 instead of the FETs 23 through 26 in the first embodiment.

All four ends of the resistance member 22 are surrounded with each of the diodes 43, 44, 45, and 46. Every component of the diodes 43 and 44 is connected to the resistance member 22 via its cathode while that of the diodes 45 and 46 is connected thereto via its anode.

The anodes of the diodes 43 are connected to each other via a conductive pattern 51 and the anodes of the diodes 44 are connected to each other via a conductive pattern 52. The cathodes of the diodes 45 are connected to each other via a conductive pattern 53 and the cathodes of the diodes 46 are connected to each other via a conductive pattern 54. The conductive patterns 51, 54 and the conductive patterns 52, 53 are connected to an unillustrated power source via potential terminals VYH and VXH respectively.

In this construction, when the terminals VYH and VXH are applied with positive and negative potentials respectively, current flows between the conductive patterns 51 and 53 via the diode 43, the resistance member 22, and the diode 45. In this case leak of the current via the conductive patterns 52 and 54 will be prevented by rectifications of the diodes 44 and 46. Therefore, closely linear equipotential lines which extend along the X axis and in parallel to each other are formed on the resistance member 22 as are they in the first embodiment.

Similarly, equipotential lines along the Y axis are formed thereon when the potential terminals VXH and VYH are applied with the positive and the negative potentials respectively.

Thus, current flows on the member 22 in directions of the X and the Y axes alternately. Also if the alternate potential were applied to the terminals VXH and VYH, the X and the Y coordinates of the pushed position would be detected automatically. Hence, when the member 22 is pushed by a stylus pen, the pushed position is detected being based on the potentials of the pushed position in two directions, one detected in the direction of X axis and the other detected in the direction of Y axis.

Figure 9:
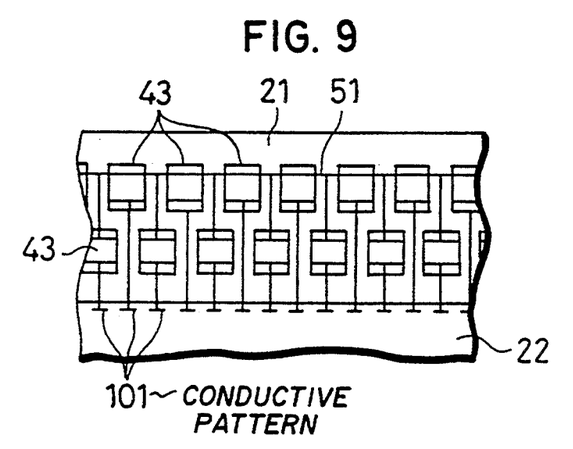
FIG. 9 is a fragmentary plan view of a first modification of the touch panel.

Although in the above embodiments every transistor including the FETs and the diodes is connected to the resistance member 22 directly, it can be connected thereto via a conductive pattern 101 in FIG. 9. In this case the FETs or the diodes are distributed in a more flexible manner, so that the FETs can be located on the resistance member 22 more densely; therefore, the linearity of the equipotential lines will be improved.

Figure 10:
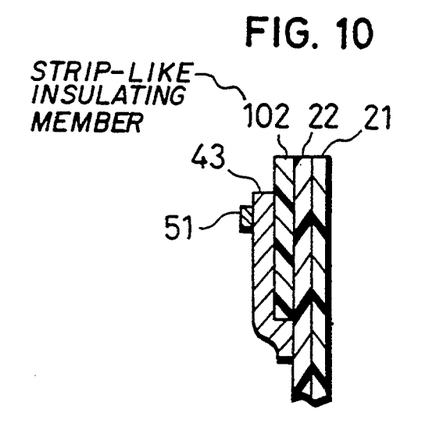
FIG. 10 is a fragmentary sectional view of a second modification of the touch panel.
Figure 11:
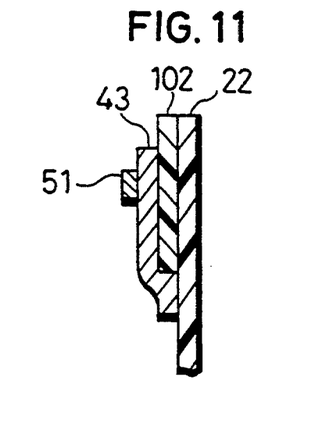
FIG. 11 is a fragmentary sectional view of a third modification of the touch panel.

As shown in FIG. 10, the FETs and the diodes may be placed on a strip like insulating member 102 which is constructed at periphery of the resistance member 22, although they are directly connected to the resistance member 22 in the above embodiments. By doing so the whole base member 21 is covered with the resistance member 22, so that both the masking and the etching can be omitted. Also in this case the base member 21 can be omitted as shown in FIG. 11.

Although in the above embodiments external force is supplied by the stylus pen to the resistance member 22, a conductive film or a resistance film, both of which have elasticity and flexibility, can be employed instead of the stylus pen. That is, the resistance film or the conductive film is placed being apart from the resistance member 22 by the fixed distance, and it contacts with the member 22 when external force is supplied thereto.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A touch panel, comprising:
   a substrate;
   a rectangular resistance member, constructed on the substrate, which includes a potential gradient formation area; and
   a plurality of thin film active elements constructed at a predetermined location of the substrate in accordance with a side of the potential gradient formation area,
   wherein each of the thin film active elements has a couple of potential gradient formation current terminals, comprised of one being connected to the side of the potential gradient formation area and the other one being connected to the gradient formation current terminal included in another thin film active element at the same side while being connected to a terminal for an external unit, and
   wherein a strip-like insulating member is formed at a periphery of the resistance member, and each thin film active element is formed on the insulating member.

* * * * *